(12) United States Patent
Uhl

(10) Patent No.: US 10,557,276 B1
(45) Date of Patent: Feb. 11, 2020

(54) MOBILE STAGE SYSTEM

(71) Applicant: Century Industries, LLC, Sellersburg, IN (US)

(72) Inventor: Robert D. Uhl, Louisville, KY (US)

(73) Assignee: Century Industries, LLC, Sellersburg, IN (US)

( * ) Notice: Subject to any disclaimer, the term of this patent is extended or adjusted under 35 U.S.C. 154(b) by 0 days.

(21) Appl. No.: 16/189,111

(22) Filed: Nov. 13, 2018

Related U.S. Application Data

(60) Provisional application No. 62/585,818, filed on Nov. 14, 2017.

(51) Int. Cl.
*E04H 3/28* (2006.01)
*B60P 3/025* (2006.01)

(52) U.S. Cl.
CPC .............. *E04H 3/28* (2013.01); *B60P 3/0252* (2013.01)

(58) Field of Classification Search
CPC ................................. E04H 3/28; B60P 3/0252
USPC ...... 52/64, 67, 79.5, 66, 69, 71, 79.9, 79.12, 52/122.1, 127.7, 143, 6, 7
See application file for complete search history.

(56) References Cited

U.S. PATENT DOCUMENTS

| | | | | |
|---|---|---|---|---|
| 3,181,203 A | * | 5/1965 | Wenger | E04B 1/34336 248/354.6 |
| 3,217,366 A | * | 11/1965 | Wenger | B60P 3/0252 49/339 |
| 3,258,884 A | * | 7/1966 | Wenger | E04H 3/22 52/182 |
| 3,866,365 A | * | 2/1975 | Honigman | E04B 1/3444 52/70 |
| 4,232,488 A | * | 11/1980 | Hanley | B60P 3/0252 108/166 |
| 4,720,945 A | | 1/1988 | Berranger et al. | |
| 5,016,403 A | * | 5/1991 | Fujita | E04H 3/28 182/223 |
| 5,078,442 A | * | 1/1992 | Rau | E04H 3/24 296/26.02 |
| 5,103,600 A | | 4/1992 | Geiger et al. | |
| 5,152,109 A | | 10/1992 | Boers | |
| RE34,468 E | * | 12/1993 | Rau | E04H 3/24 296/26.02 |
| 5,327,698 A | * | 7/1994 | Uhl | B60P 3/025 52/144 |
| 5,375,899 A | | 12/1994 | Wright | |
| 5,398,463 A | | 3/1995 | Wright | |
| 5,400,551 A | | 3/1995 | Uhl | |
| 5,546,709 A | * | 8/1996 | Decker | E04H 3/28 296/26.07 |

(Continued)

*Primary Examiner* — Joshua K Ihezie
(74) *Attorney, Agent, or Firm* — Stites & Harbison, PLLC; David W. Nagel, Jr.; James R. Hayne

(57) ABSTRACT

In a mobile stage system, a pair of hydraulic actuators at each end of the stage, in combination with certain structural elements, provides all of the necessary movement to transition the mobile stage system from the transport position to a deployed position, i.e., raise the roof and deploy an outer deck panel of the stage. The roof includes a first upper panel and a second upper panel, which rotate upward while the outer deck panel rotates downward. The upper deck panels of the mobile stage are automatically locked into place when in the deployed position by way of the linkage members connecting the outer deck panel to the upper panels.

22 Claims, 9 Drawing Sheets

(56) References Cited

U.S. PATENT DOCUMENTS

| | | | |
|---|---|---|---|
| 6,176,495 B1* | 1/2001 | Decker | B60S 9/12 |
| | | | 280/6.153 |
| 8,296,999 B2 | 10/2012 | Uhl | |
| 8,544,213 B2 | 10/2013 | Allison | |
| 8,978,311 B1* | 3/2015 | Uhl | B60P 3/0252 |
| | | | 52/36.1 |
| 9,021,746 B1 | 5/2015 | Uhl | |
| 2004/0123529 A1* | 7/2004 | Wiese | E04H 3/28 |
| | | | 52/6 |
| 2012/0096775 A1* | 4/2012 | Allison | B60P 3/0252 |
| | | | 52/7 |
| 2016/0102740 A1* | 4/2016 | Martyn | F16H 21/04 |
| | | | 52/69 |

* cited by examiner

MOBILE STAGE SYSTEM

CROSS-REFERENCE TO RELATED APPLICATIONS

The present application claims priority to U.S. Provisional Patent Application Ser. No. 62/585,818 filed on Nov. 14, 2017, the entire disclosure of which is incorporated herein by reference.

BACKGROUND OF THE INVENTION

Stages provide a platform for concerts, theatrical performances, and other similar events. Permanent stages are installed in locations where such events are frequent. However, for events that occur on a less frequent basis, temporary stage systems may be used. Such temporary stage systems are often mounted on some form of mobile framework for ready transport to the location of the event. Once at the appropriate location, the stage system can be transitioned from a transport position to a deployed position using hydraulic actuators (or similar mechanical or electromechanical actuators). Thus, such mobile stage systems provide the desired functionality on a short-term basis and without the time and labor required to set up conventional stages.

In prior art mobile stage systems, after the stage system has been transitioned to the deployed position, it is often necessary to erect vertical columns to support the roof and canopies of the stage system, which may obstruct the view of an audience. Furthermore, in prior art mobile stage systems, the use of hydraulic actuators is quite complicated, with many stages having independent circuits to power the roof, canopy(s), and deck(s).

To address some such deficiencies, U.S. Pat. No. 8,978,311 (which is incorporated herein by reference) describes one construction of a mobile stage system in which a pair of hydraulic cylinders at either end of the stage system, in combination with certain structural elements, provides all of the necessary movement to raise the roof and deploy the canopies. Furthermore, U.S. Pat. No. 8,978,311 describes that, at least in some embodiments, the actuation of the hydraulic cylinders may effectuate not only raising of the roof and deployment of the canopies, but also deployment of the outer deck panels of the stage.

However, there is still a need for alternate mobile stage systems, especially for smaller events, in order to reduce operational costs, eliminate loose structural components that could be assembled incorrectly, and improve the audience experience by not blocking the view with corner roof support columns.

SUMMARY OF THE INVENTION

The present invention is an improved mobile stage system that addresses the deficiencies of prior art mobile stage systems by providing a construction in which a pair of hydraulic actuators at each end of the stage, in combination with certain structural elements, provides all of the necessary movement to raise the roof and deploy the canopies. The mobile stage system of the present invention also includes various other features and aspects that are important to the function and operation of the stage system and/or represent advancements or improvements over prior art mobile stage systems.

For example, in some exemplary embodiments, a main deck panel is mounted to the support structure, and an outer deck panel extends from a forward edge of the support structure. A stage frame is mounted to the support structure and includes a first corner column fixedly connected at the rear edge of the support structure adjacent to the first end of the support structure and a second corner column fixedly connected at the rear edge of the support structure adjacent to the second end of the support structure. A first upper panel is connected to the top of the stage so as to extend over the main deck panel, and a second upper panel with associated supports is similarly connected to the first upper panel opposite the stage frame, such that the second upper panel extends over the outer deck panel. One or more linkage members operably connect the outer deck panel to the first upper panel and the second upper panel, such that, as the one or more actuators are retracted, the outer deck panel rotates downward from the transport position to the deployed position, and, as a result of the rotation of the outer deck, the first upper panel and the second upper panel rotate upward relative to the stage frame.

In some exemplary embodiments, the outer deck panel is operably connected to the first upper panel and the second upper panel by a bell-crank linkage fixedly connected to the outer deck panel, a first strut extending between the bell-crank linkage and the first upper panel, and a second strut extending between the bell-crank linkage and the second upper panel. When the mobile stage system is in the deployed position, the first strut and the second strut extend beyond (i.e., are over-center) a pivot axis between the outer deck panel and the support structure. Therefore, the first upper panel and second upper panel are automatically locked in the deployed position.

In some exemplary embodiments, when the mobile stage system is in the transport position, the outer deck panel is in an upright orientation relative to the support structure and surrounded by the sidewall, the first upper panel, and the second upper panel, which partially form a substantially closed trailer.

DETAILED DESCRIPTION OF THE INVENTION

Figure 1:
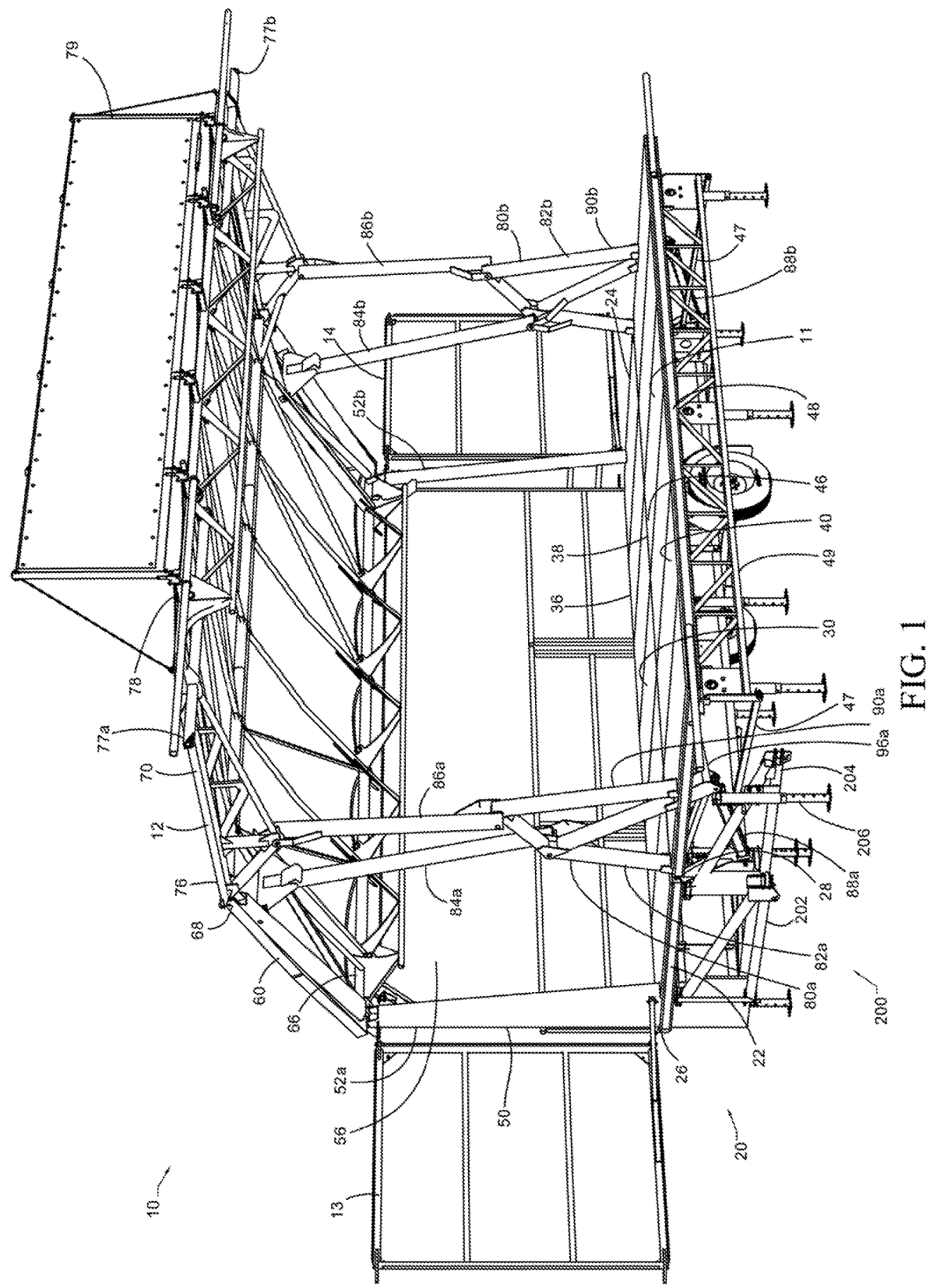
FIG. 1 is a perspective view of an exemplary mobile stage system made in accordance with the present invention in a deployed position.
Figure 2:
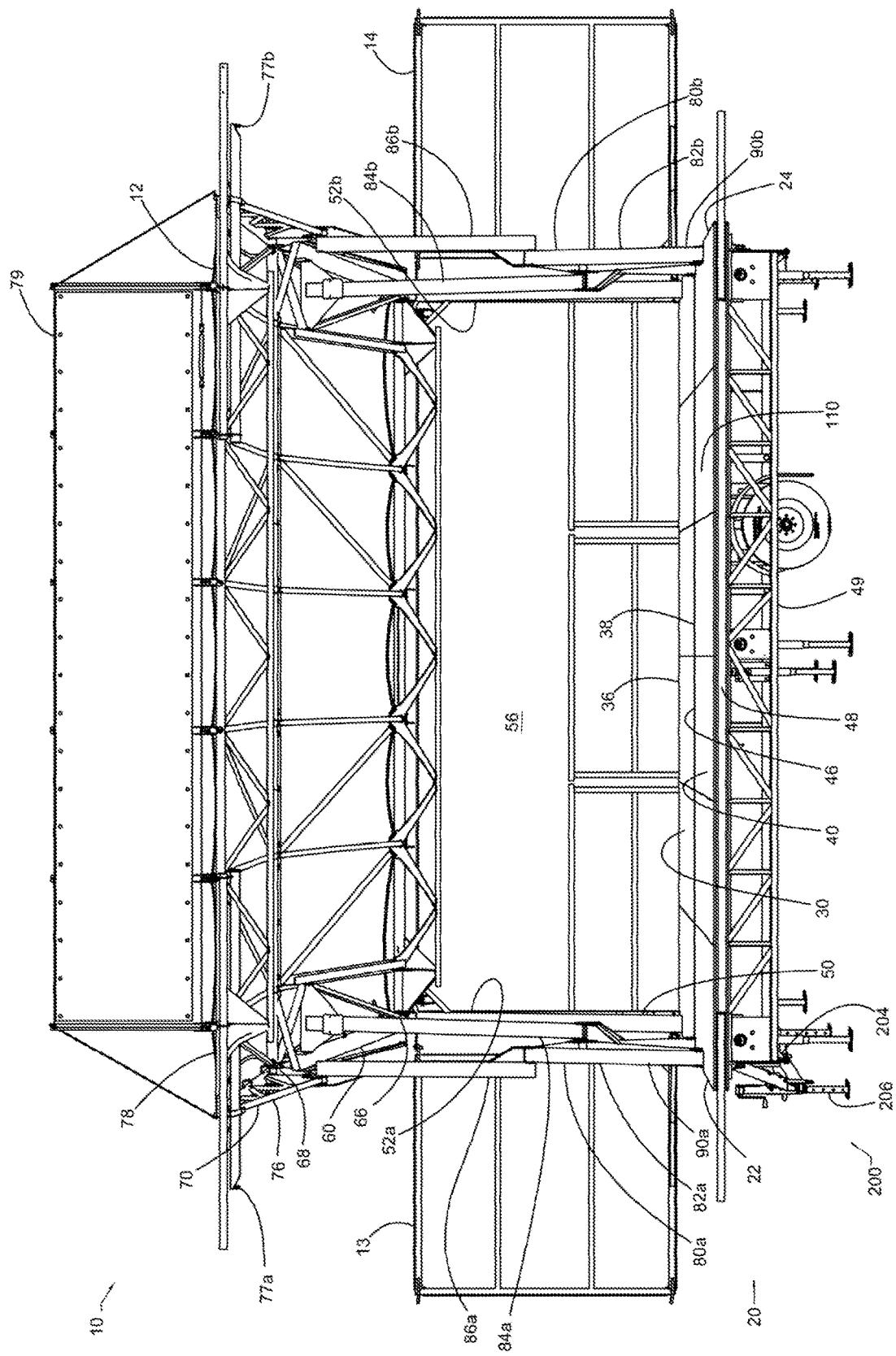
FIG. 2 is a front view of the exemplary mobile stage system of FIG. 1.
Figure 3:
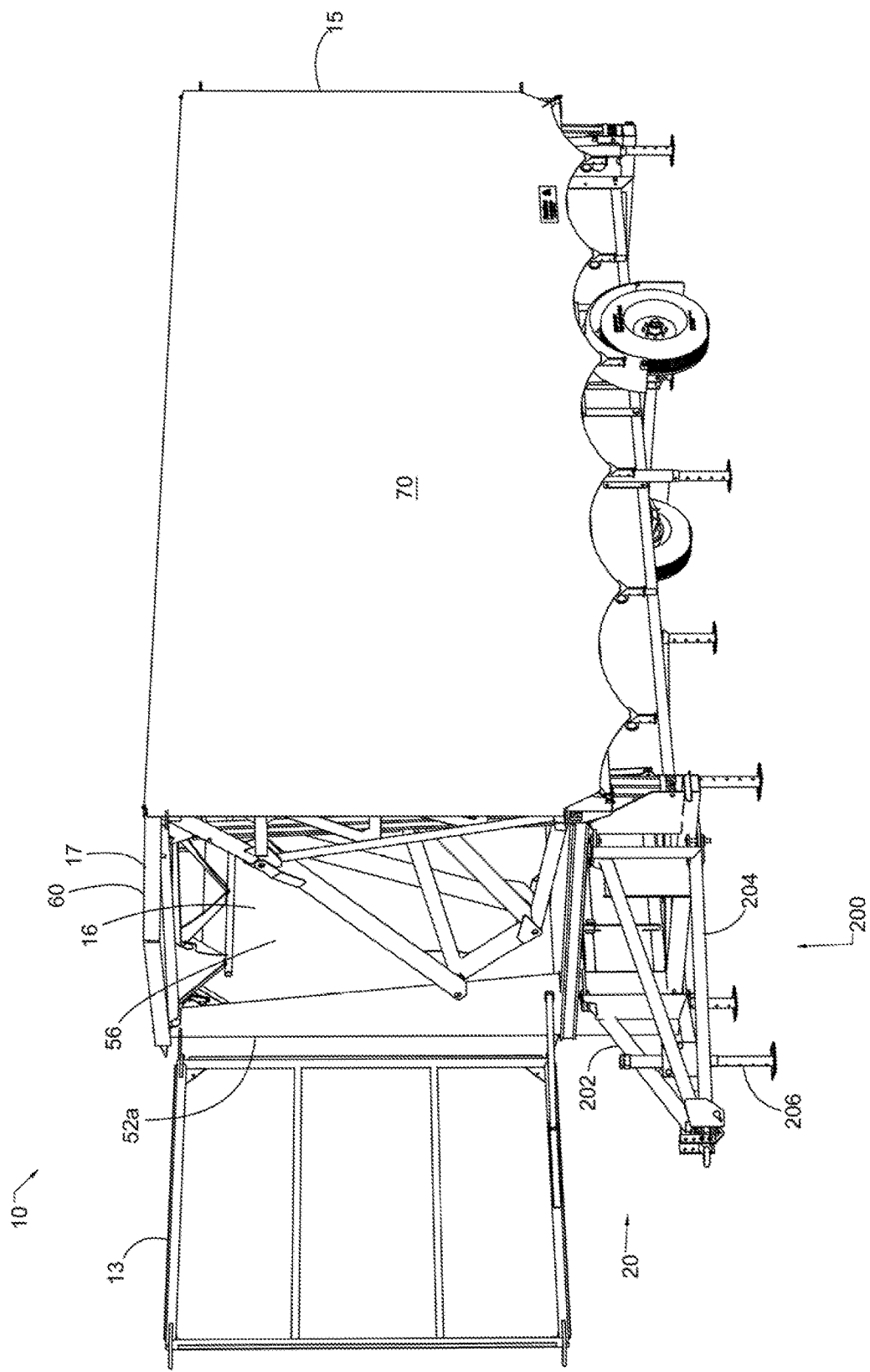
FIG. 3 is a perspective view of the exemplary mobile stage system similar to FIG. 1, with the first upper panel, second upper panel, and outer deck panel in a transport position.
Figure 4:
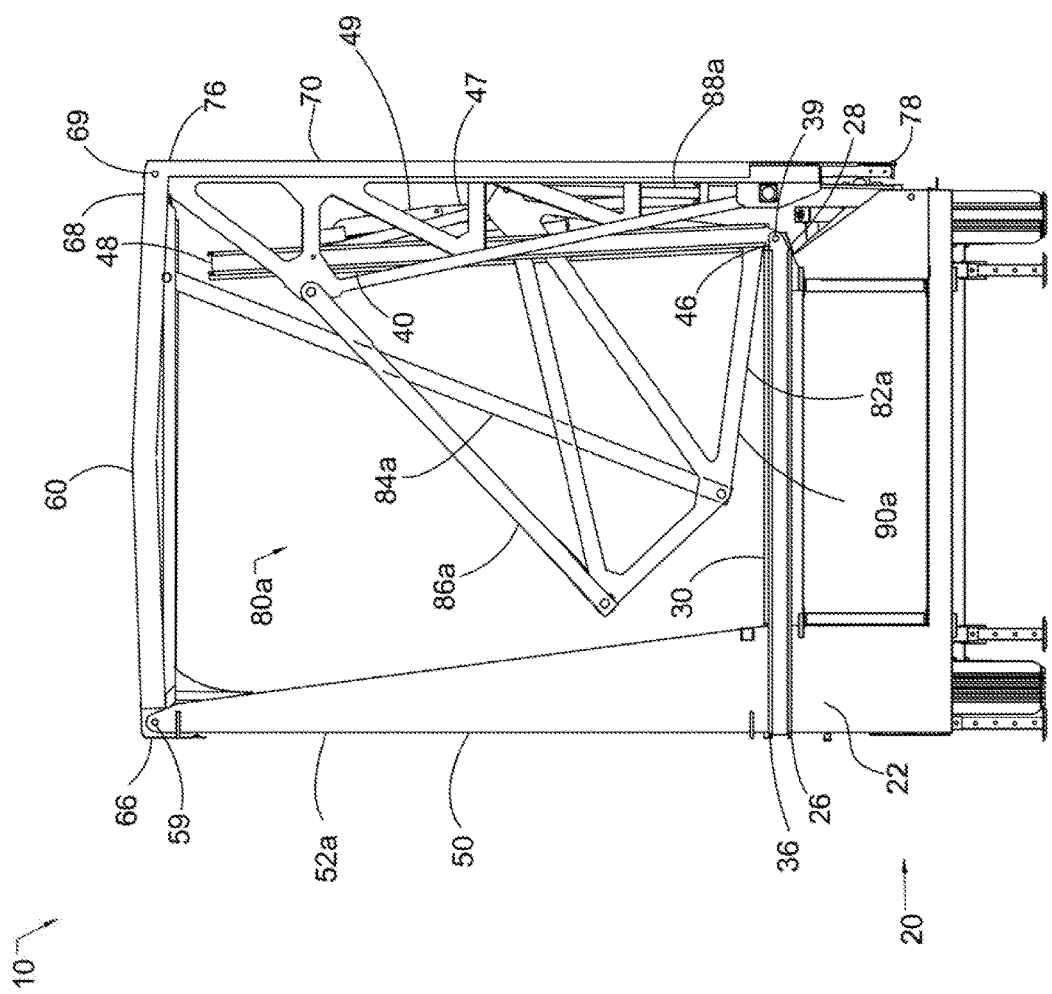
FIG. 4 is a side view of the exemplary mobile stage system of FIG. 1, with certain elements removed for purposes of illustration, and showing the first upper panel, second upper panel, and outer deck panel in the transport position.
Figure 5:
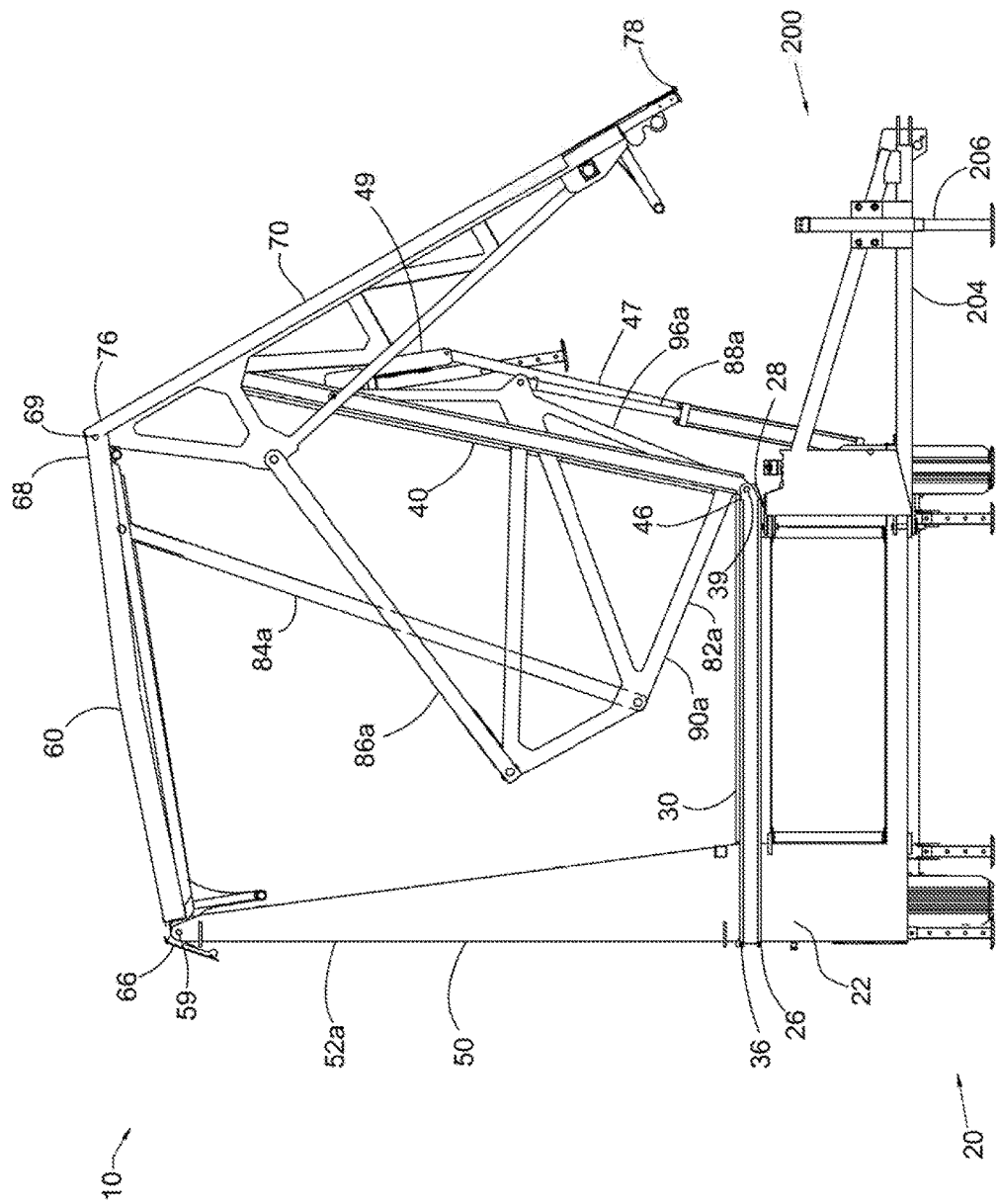
FIG. 5 is a side view of the exemplary mobile stage system similar to FIG. 4, but showing the first upper panel, second upper panel, and outer deck panel beginning to transition from the transport position to the deployed position.
Figure 6:
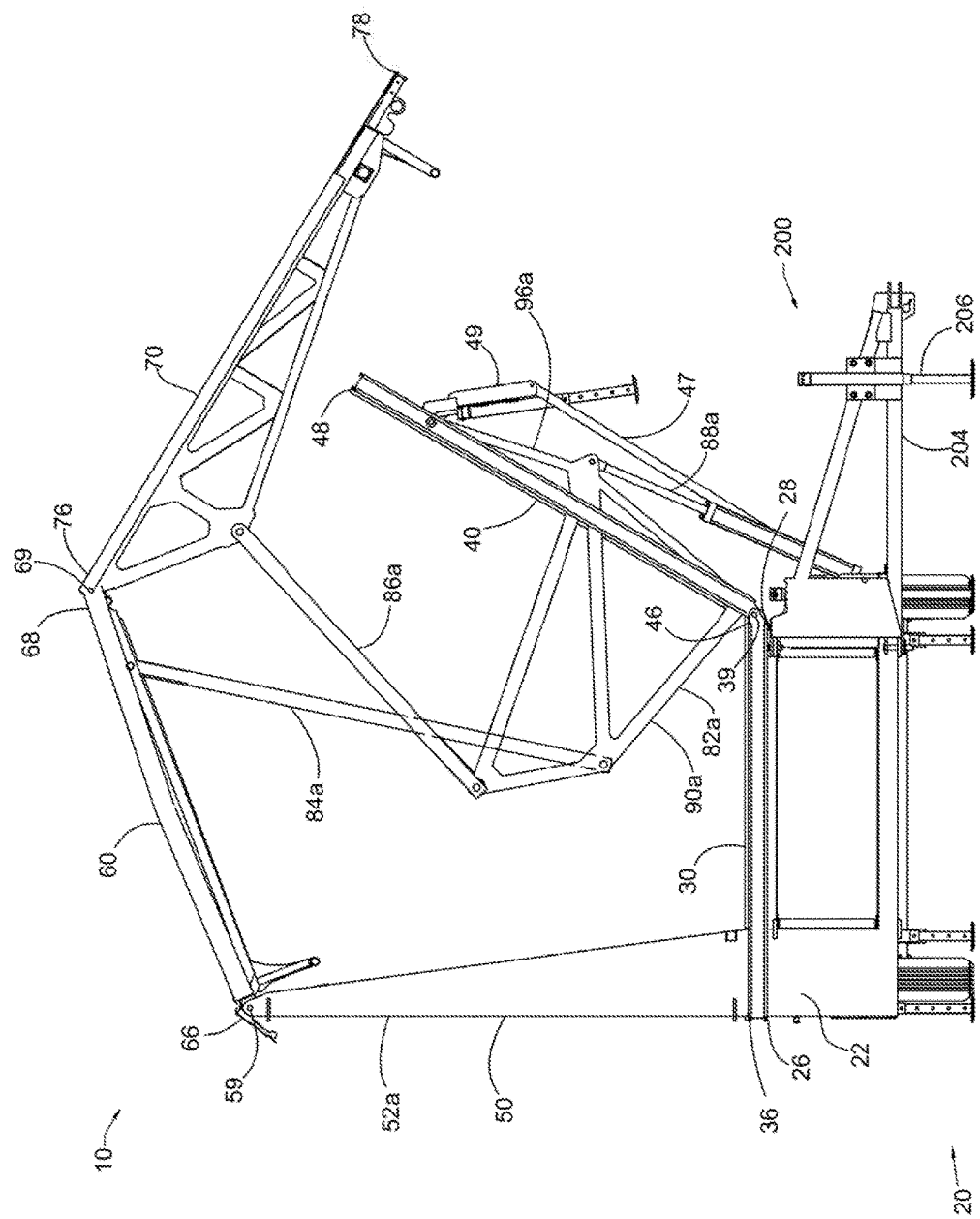
FIG. 6 is a side view of the exemplary mobile stage system similar to FIGS. 4-5 as it continues to transition from the transport position to the deployed position.
Figure 7:
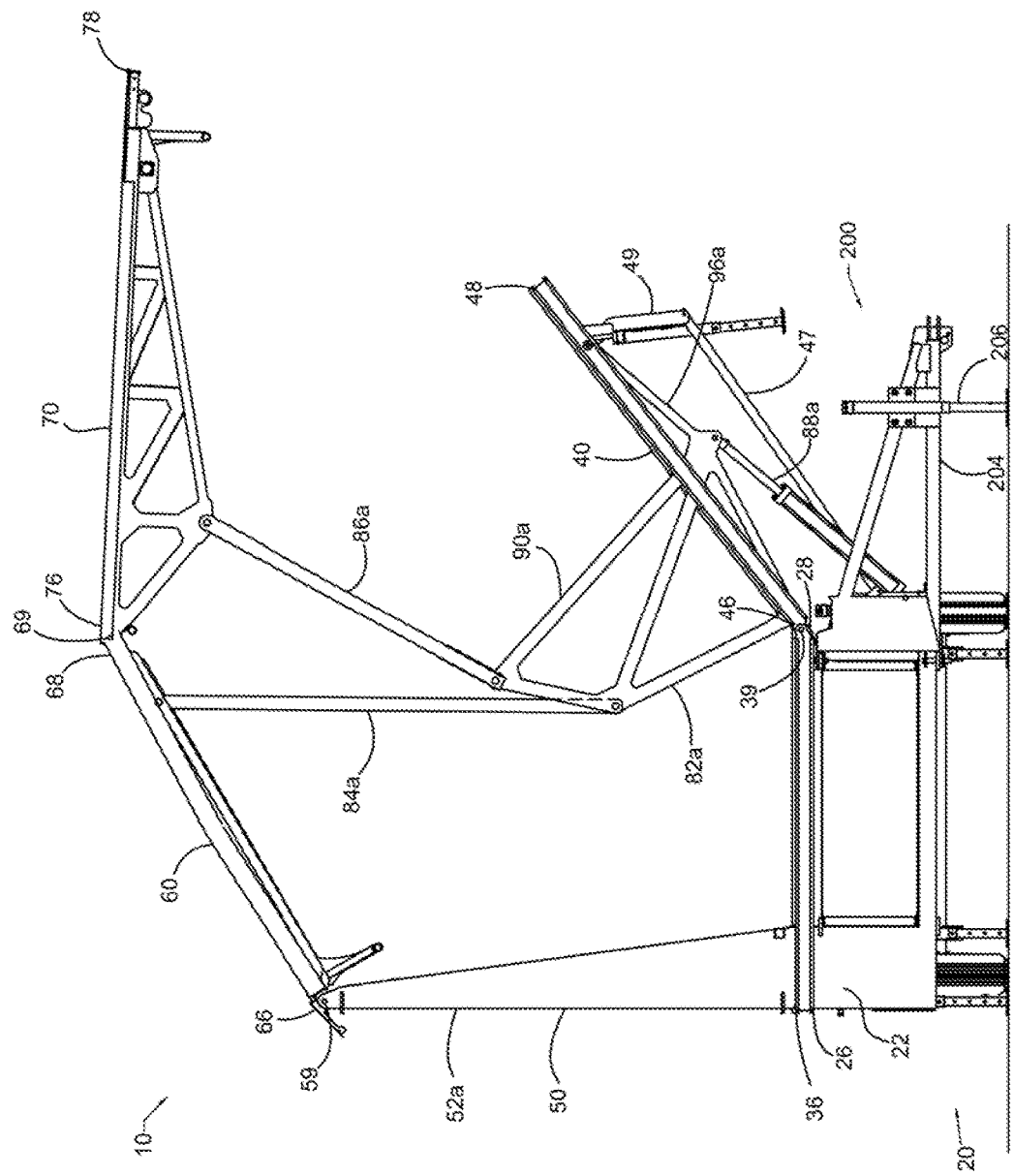
FIG. 7 is a side view of the exemplary mobile stage system similar to FIGS. 4-6 as it continues to transition from the transport position to the deployed position.

Referring first to FIGS. 1-3, the present invention is an improved mobile stage system in which a pair of hydraulic actuators at each end of the stage, in combination with certain structural elements, provides all of the necessary movement to transition between a transport position (FIG. 3) and a deployed position (FIGS. 1 and 2). The exemplary mobile stage system 10 includes an underlying support structure, which is generally indicated by reference numeral 20. Wheels and an associated suspension system are mounted to the underlying support structure 20 to facilitate transport of the mobile stage system 10, and it is preferred that the mobile stage system 10 is equipped with the necessary hitch assembly 200, suspension, and other equipment as necessary to satisfy relevant Department of Transportation requirements so that the mobile stage system 10, when in the transport position, can be towed behind a truck. The support structure 20 has a first (or hitch) end 22 which is adjacent to the hitch assembly 200 and a second (or tail) end 24 opposite the first end 22. The first end 22 of the support structure 20 is located at stage right (i.e., to the left when looking at the stage from the audience) and the second end 24 of the support structure 20 is located at stage left (i.e., to the right when looking at the stage from the audience).

Figure 9:
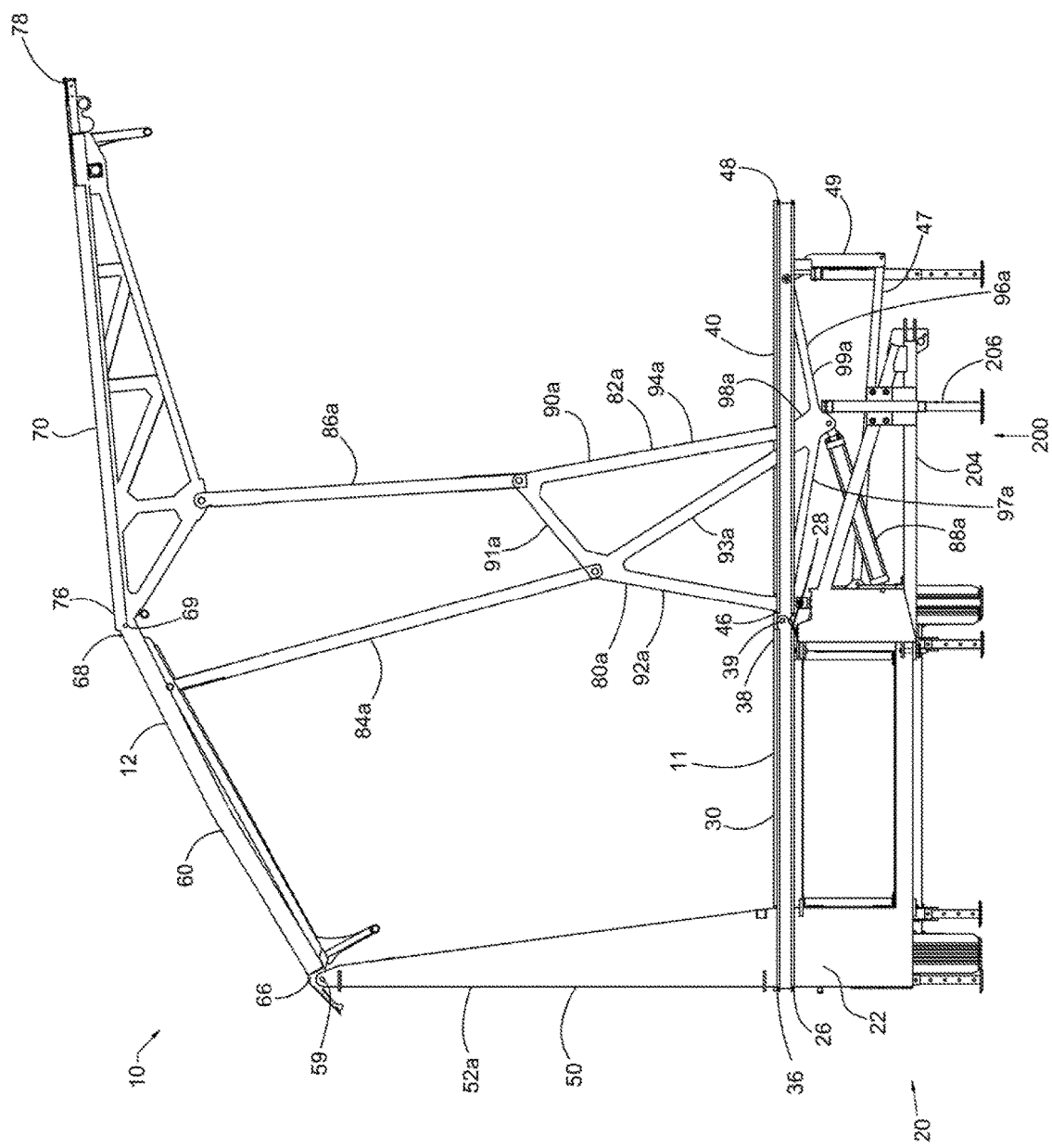
FIG. 9 is a side view of the exemplary mobile stage system of FIG. 1 in the deployed position.

Referring still to FIGS. 1 and 2, along with FIG. 9, the exemplary mobile stage system 10 further includes a fixed (or main) deck panel 30 which is mounted to the support structure 20. The main deck panel 30 extends substantially from the first end 22 of the support structure 20 to the second end 24 of the support structure 20, and across substantially the entire width of the support structure 20, with a rear edge 36 of the main deck panel 30 substantially aligned with a rear edge 26 of the support structure 20, and with a forward edge 38 of the main deck panel 30 substantially aligned with a forward edge 28 of the support structure 20.

The exemplary mobile stage system 10 further includes a fold-out (or outer) deck panel 40 that, when in the deployed position, is in a substantially horizontal orientation and substantially coplanar with the main deck panel 30. In particular, the outer deck panel 40 extends substantially from the first end 22 of the support structure 20 to the second end 24 of the support structure 20, with a rear edge 46 of the outer deck panel 40 aligned with the forward edge 38 of the main deck panel 30, and with a forward edge 48 of the outer deck panel 40 positioned opposite the rear edge 46 of the outer deck panel 40. The outer deck panel 40 is preferably attached to the support structure 20 via a pin connection 39 (shown in FIG. 9), such that the outer deck panel 40 rotates about a substantially horizontal pivot axis, as discussed further below, although other connection means could also be used without departing from the spirit and scope of the present invention.

A stage frame 50 is mounted to the support structure 20 so as to extend substantially vertically upward from the support structure 20 above the main deck panel 30. The stage frame 50 includes a first corner column 52a fixedly connected at the rear edge 26 of the support structure 20 adjacent to the first end 22 of the support structure 20 and a second corner column 52b fixedly connected at the rear edge 26 of the support structure 20 adjacent to the second end 24 of the support structure 20. An optional sidewall panel 56 extends between the first corner column 52a and the second corner column 52b. It is contemplated that, when included, the sidewall panel 56 operates as a windwall and/or a backdrop for the mobile stage system 10.

A first upper panel 60 with associated supports is connected to the top of the stage frame 50 so as to extend, at least partially, over the main deck panel 30. In particular, the first upper panel 60 extends substantially from the first end 22 of the support structure 20 to the second end 24 of the support structure 20, with a rear edge 66 of the first upper panel 60 connected to the upper ends of the first and second corner columns 52a, 52b of the stage frame 50, and with a forward edge 68 of the first upper panel 60 positioned over the main deck panel 30. The first upper panel 60 is preferably attached via a pin connection 59 (shown in FIG. 9) to the respective tops of the first and second corner columns 52a, 52b, although other connection means could also be used without departing from the spirit and scope of the present invention. A second upper panel 70 with associated supports is similarly connected to the first upper panel 60, with a rear edge 76 of the second upper panel 70 connected to the forward edge 68 of the first upper panel 60 via pin connections 69 (shown in FIG. 9), and with a forward edge 78 of the second upper panel 70 positioned opposite the rear edge 76 of the second upper panel 70, such that the second upper panel 70 extends over the outer deck panel 40. As such, both the first upper panel 60 and the second upper panel 70 rotate about a substantially horizontal pivot axis. As is perhaps best shown in FIG. 9, in the deployed position, the first upper panel 60 is oriented upward and at an angle relative to the first and second corner columns 52a, 52b of the stage frame 50, whereas the second upper panel 70 is in a substantially horizontal orientation relative to the outer deck panel 40 and the underlying ground surface.

In the exemplary embodiment shown in FIGS. 1 and 2, a detachable marquee 79 is removably connected to the second upper panel 70 adjacent to the forward edge 78 of the second upper panel 70. Furthermore, retractable speaker lugs 77a, 77b are located at each end of the second upper panel 70 to allow for the inclusion of sound systems. Of course, other similar attachments and/or accessories can optionally be included on the stage frame 50, first upper panel 60, and/or second upper panel 70 of the present invention without departing from the spirit and scope of the present invention.

Referring still to FIGS. 1, 2, and 9, when the mobile stage system 10 is in the deployed position, the outer deck panel 40 is rotated downward into a substantially horizontal orientation, such that it is substantially coplanar and cooperates with the main deck panel 30 to collectively form a stage deck 11 of the mobile stage system 10. Furthermore, the first upper panel 60 and the second upper panel 70 collectively form a roof 12 of the mobile stage system 10, which substantially covers the entirety of the stage deck 11 formed by the main deck panel 30 and the outer deck panel 40.

Referring now to FIG. 3, when the mobile stage system 10 is in the transport position, the first upper panel 60 is rotated downward into a substantially horizontal orientation and serves as the top wall 17 of the "trailer," and the second upper panel 70 is rotated downward into a substantially vertical orientation and serves as one of the side walls 15 of the "trailer." Although not shown in its entirety, when the mobile stage system 10 is in the transport position, the stage frame 50, i.e., the first and second corner columns 52a, 52b and the sidewall panel 56, are in substantially the same position as shown in FIG. 1 and form the other side wall 16 of the "trailer." In FIG. 3, the first door 13 is in the same open (deployed) position as in FIGS. 1 and 2; however, the first door 13 is pivotally connected to the first corner column 52a, and a second door 14 (shown only in FIGS. 1 and 2) is pivotally connected to the second corner column 52b, such that each of the first and second doors 13, 14 pivots about a substantially vertical axis between a deployed position and transport position. As perhaps best shown in FIG. 1, when in the deployed position, the first door 13 and the second door 14 are substantially coplanar with the sidewall panel 56, thus extending the windwall and/or backdrop for the mobile stage system 10. Although not expressly shown, it should be understood that, when the mobile stage system 10 is in the transport position, both the first door 13 and the second door 14 are swung closed and secured to the support structure 20 so as to form a substantially closed "trailer." As discussed further below, when the mobile stage system 10 is in the transport position, the outer deck panel 40 is rotated upward into a substantially vertical orientation and entirely surrounded by the stage frame 50, the first upper panel 60 and the second upper panel 70, i.e., contained within the substantially closed "trailer."

Referring again to FIGS. 1, 2 and 9, the exemplary mobile stage system 10 further includes a first deployment assembly 80a mounted at the first end 22 of the support structure 20, and a second deployment assembly 80b mounted at the second end 24 of the support structure 20. Each deployment assembly 80a, 80b includes an actuator 88a, 88b, as well as a plurality of linkage members which generally comprise: a bell-crank linkage 82a, 82b; a first strut 84a, 84b; and a second strut 86a, 86b.

Referring now specifically to FIG. 9, which most clearly shows the structure of the bell-crank linkage 82a, the bell-crank linkage 82a is comprised of multiple members 91a, 92a, 93a, 94a, 97a, 98a, 99a fixed relative to the outer deck panel 40. In particular, four of the members 91a, 92a, 93a, 94a are positioned above the outer deck panel 40 and can be characterized as a bell-crank superstructure 90a of the bell-crank linkage 82a, and three of the members 97a, 98a, 99a are positioned below the outer deck panel 40 and can be characterized as a bell-crank substructure 96a of the bell-crank linkage 82a. The bell-crank linkage 82a is pivotally connected to the forward edge 28 of the support structure 20 at the same pin connection 39 as the outer deck panel 40. Of course, the other bell-crank linkage 82b is similarly pivotally connected to the forward edge 28 of the support structure 20 and is formed with four members forming a bell-crank superstructure 90b (FIGS. 1-2) positioned above the outer deck panel 40 and three members forming a bell-crank substructure (not shown) positioned below the outer deck panel 40.

Referring now once again to FIGS. 1, 2 and 9, each of the first struts 84a, 84b extends between and is connected to one of the bell-crank superstructures 90a, 90b and the first upper panel 60, whereas each of the second struts 86a, 86b extends between and is connected to one of the bell-crank superstructures 90a, 90b and the second upper panel 70. In each instance, the connections are preferably pin connections, although other connection means could also be used without departing from the spirit and scope of the present invention. Each of the actuators 88a, 88b of the deployment assemblies 80a, 80b extends between and is connected to the support structure 20 and the respective bell-crank substructures 96a, 96b. The actuators 88a, 88b are retracted to transition the deployment assemblies 80a, 80b (along with the outer deck panel 40, first upper panel 60, and second upper panel 70) to the deployed position or extended to return the deployment assemblies 80a, 80b (along with the outer deck panel 40, first upper panel 60, and second upper panel 70) to the transport position, as further discussed below. To this end, each actuator 88a, 88b is preferably a hydraulic actuator or similar mechanical or electromechanical actuator.

Referring now to FIGS. 4-9 which illustrate the transition of the deployment assemblies 80a, 80b (along with the outer deck panel 40, first upper panel 60, and second upper panel 70) from the transport position (FIG. 4) to the deployed position (FIG. 9), there are multiple movements associated with the transition of the deployment assemblies 80a, 80b between the deployed position and the transport position, and vice versa. Although the following description is given solely with reference to the first deployment assembly 80a, it should be understood that the second deployment assembly 80b operates in exactly the same manner.

As shown in FIGS. 4-9, as the actuator 88a is retracted, the bell-crank linkage 82a begins rotating downward (or clockwise in FIGS. 4-9) about a pivot axis defined by the pin connection 39 between the bell-crank linkage 82a and the forward edge 28 of the support structure 20. As the bell-crank linkage 82a is fixed to the outer deck panel 40, the outer deck panel 40 also rotates downward (or clockwise in FIGS. 4-9). At the same time, the first strut 84a is forced upward by the rotating bell-crank linkage 82a, and the first upper panel 60 is pushed upward by the first strut 84a, rotating about a pivot axis defined by the pin connection 59 between the first corner column 52a and the first upper panel 60. Likewise, the second strut 86a is forced upward by the rotating bell-crank linkage 82a, and the second upper panel 70 is pushed upward by the second strut 86a, rotating about a pivot axis defined by the pin connection 69 between the first upper panel 60 and the second upper panel 70.

Figure 8:
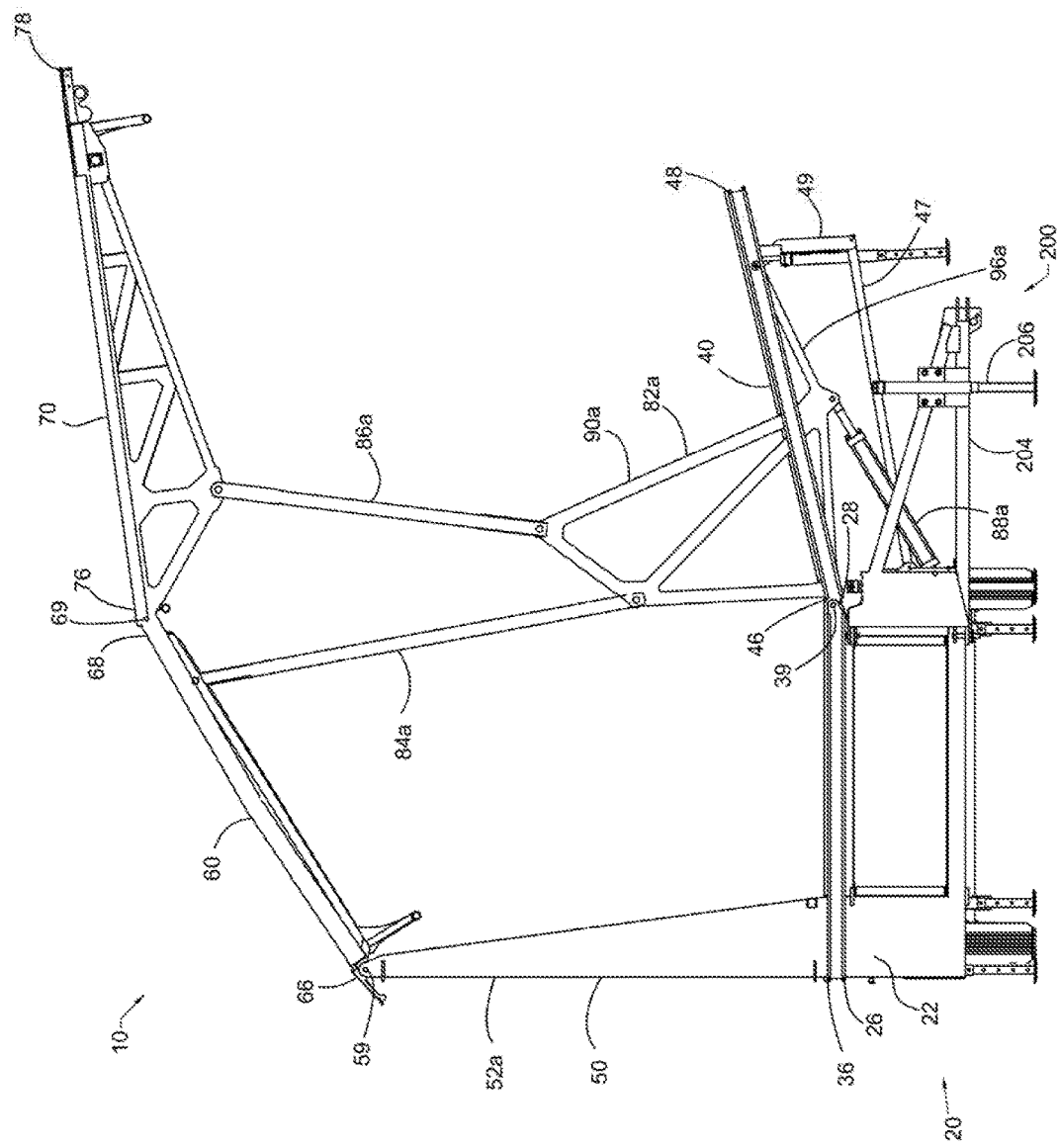
FIG. 8 is a side view of the exemplary mobile stage similar to FIGS. 4-7 as it continues to transition from the transport position to the deployed position.

As shown in FIGS. 4-7, when the mobile stage system 10 is in the transport position and through the beginning of the rotation of the bell-crank linkage 82a (and the outer deck panel 40), the first strut 84a and the second strut 86a are each directed along a line passing behind the forward edge 28 of the support structure 20. By comparison, as shown in FIGS. 8 and 9, as the bell-crank linkage 82a (and the outer deck panel 40) continues to rotate and ultimately reaches the deployed position, the first strut 84a and the second strut 86a move and rotate so as to be directed along a line passing in front of the forward edge 28 of the support structure 20. In other words, when the mobile stage system 10 is in the deployed position, the first strut 84a and the second strut 86a extend beyond (i.e., are over-center) the pin connection 39 between the bell-crank linkage 82a and the forward edge 28 of the support structure 20. Therefore, the first upper panel 60 and second upper panel 70 are automatically locked in the deployed position.

Of course, when the mobile stage system 10 is in the deployed position, extension of the actuator 88a causes the bell-crank linkage 82a (and outer deck panel 40) to begin rotating upward (or counter-clockwise in FIGS. 4-9) about a pivot axis defined by the pin connection 39 between the bell-crank linkage 82a and the forward edge 28 of the support structure 20. The first upper panel 60 and second upper panel 70 are allowed to fold back downward into the transport position as the first strut 84a and the second strut 86a are moved downward by the rotating bell-crank linkage 82a. As such, activation of the actuators 88a, 88b, in combination with the unique design of the deployment assemblies 80a, 80b provides all of the necessary movement to transition the mobile stage system 10 between a transport position and a deployed position.

Although not shown, it is contemplated that the actuators 88*a*, 88*b* can include locking bars or locking actuators; however, any such locking bars or locking actuators are not considered critical to the above-described transition between the transport position and the deployed position. Thus, the various linkage members and actuators 88*a*, 88*b* of the deployment assemblies 80*a*, 80*b* provide all of the necessary movement to raise and lower the first upper panel 60 and second upper panel 70 while simultaneously rotating and deploying (or retracting) the outer deck panel 40.

Advantageously, the mobile stage system 10 of the present invention therefore requires fewer actuators and locking pins than other prior art mobile stage systems. Furthermore, all of the pivoting connections between the outer deck panel 40, the first upper panel 60, and the second upper panel 70 can remain connected at all times, assuring a safer setup with less labor every time the mobile stage system 10 is transitioned between the transport position and the deployed position.

As also shown in FIGS. 1, 2, and 4-9, the exemplary mobile stage system 10 further includes a front leg assembly 49 with a plurality of legs configured to engage an underlying surface (i.e., the ground) and support the outer deck panel 40 in the deployed position. The front leg assembly 49 is pivotally connected to the forward edge 48 of the outer deck panel 40. One or more cross-members 47 are pivotally connected to the front leg assembly 49, and the support structure 20, which causes the front leg assembly 49 to automatically rotate between a transport position, in which the legs are immediately adjacent to the outer deck panel 40, to a deployed position, in which the legs are substantially perpendicular to the outer deck panel 40, as the outer deck panel 40 rotates downward into the deployed position.

Referring now to FIGS. 1-3 and 5-9, it is further contemplated that the mobile stage system 10 of the present invention can be equipped with a hitch assembly 200, which is secured to and extends from the first end 22 of the support structure 20, but can be folded forward when the stage system is in the deployed position. In this regard, in prior art constructions, the hitch (commonly a gooseneck, fifth wheel, tongue/ball, or pintle hitch) is sometimes configured such that it can be folded into a vertical orientation when the stage system is in a deployed position. However, when folded into such a vertical orientation, the hitch remains in the view of the audience and can also be an impediment to entry and exit from the side of the stage near the hitch and/or an impediment to communications between performers or the stage and technicians on the side of the stage.

Accordingly, it is contemplated that the hitch assembly 200 can be swung from a first (transport) position (shown in FIG. 3 but removed from FIG. 4 for clarity) to a second (deployed) position shown in FIGS. 1, 2, and 5-9. The hitch assembly 200 includes a first member 202 and a second member 204 pivotally connected to the support structure 20 and removably connected to each other at their ends. Thus each of the members 202, 204 can be swung independently so as to be substantially flush with the first end 22 of the support structure 20. Thus, as shown in FIG. 2, the hitch assembly 200 is out of view of the audience and is not an impediment to entry and exit from the side of the stage near the hitch, nor an impediment to communications between performers on the stage and technicians on the side of the stage. Furthermore, the second member 204 includes a leg 206, which, when the hitch assembly 200 is in the deployed position, can be used to help support the mobile stage system 10 during deployment, i.e., while the outer deck panel 40 is being rotated downward but before the plurality of legs of the front leg assembly 49 have engaged the ground and support the outer deck panel 40 in the deployed position.

In the embodiment illustrated in the Figures, the first upper panel 60 and the second upper panel 70 are integrally formed as a single panel, with the sidewall panel 56 separate and detached. In some other exemplary embodiments, however, the sidewall panel 56, first upper panel 60, and/or second upper panel 70 of the mobile stage system 10 are in the form of a single, one-piece fabric covering, which eliminates leaks and joint maintenance. This is contrasted to many prior art constructions in which the roof and canopy materials are in the form of (i) a fabric covering that is only loosely attached, (ii) a fabric covering that requires reinstallation each time the stage system is set up, or (iii) rigid panels that require separate panels for each of the sidewall panel 56, first upper panel 60, and second upper panel 70, along with flexible weather joints between panels. Further details regarding such one-piece fabric coverings can be found in U.S. Pat. No. 8,978,311, which, as mentioned above, is incorporated herein by reference.

One of ordinary skill in the art will recognize that additional embodiments and configurations are also possible without departing from the teachings of the present invention or the scope of the claims which follow. This description, and particularly the specific details of the exemplary embodiments disclosed, is given primarily for clarity of understanding, and no unnecessary limitations are to be understood therefrom, for modifications will become obvious to those skilled in the art upon reading this disclosure and may be made without departing from the spirit or scope of the claimed invention.

The invention claimed is:

1. A mobile stage system for transitioning between a transport position and a deployed position, comprising:
   a support structure mounted on wheels;
   a stage frame extending upward from the support structure;
   an outer deck panel pivotally connected to the support structure opposite from the stage frame;
   a first upper panel pivotally connected to the stage frame;
   a bell-crank linkage pivotally connected to the support structure and fixedly connected to the outer deck panel;
   a first strut extending between the bell-crank linkage and the first upper panel, the first strut pivotally connected to the bell-crank linkage and to the first upper panel; and
   one or more actuators operably connected to the bell-crank linkage, such that, through activation of the one or more actuators, the outer deck panel rotates and transitions between the transport position and the deployed position, with the bell-crank linkage and the outer deck panel rotating downward to the deployed position, while the first strut is forced upward by the rotating bell-crank linkage, thus pushing and rotating the first upper panel upward relative to the stage frame to the deployed position.

2. The mobile stage system as recited in claim 1, wherein, as the one or more actuators are retracted, the outer deck panel rotates and the bell-crank linkage rotate downward from the transport position to the deployed position.

3. The mobile stage system as recited in claim 1, and further comprising:
   a main deck panel mounted to the support structure;
   wherein, when the mobile stage system is in the deployed position, the outer deck panel is rotated downward into a substantially horizontal orientation and cooperates with the main deck panel to form a stage deck, with the first upper panel extending over the stage deck.

4. The mobile stage system as recited in claim 1, and further comprising:
a second upper panel pivotally connected to a forward edge of the first upper panel opposite the stage frame; and
a second strut extending between the bell-crank linkage and the second upper panel, the second strut pivotally connected to the bell-crank linkage and the second upper panel, such that, as a result of the rotation of the outer deck panel and the bell-crank linkage from the transport position to the deployed position, the second upper panel rotates upward relative to the first upper panel.

5. The mobile stage system as recited in claim 4, wherein, when the mobile stage system is in the transport position, the first upper panel is in a substantially horizontal orientation, and the second upper panel is in a substantially vertical orientation, such that, the stage frame, the first upper panel, and the second upper panel partially form a substantially closed trailer, and the outer deck panel is rotated upward into a substantially vertical orientation and contained within the substantially closed trailer.

6. The mobile stage system as recited in claim 4, wherein, when the mobile stage system is in the deployed position, the first strut extends beyond a pivot axis between the outer deck panel and the support structure, and the second strut extends beyond the pivot axis between the outer deck panel and the support structure, such that the first upper panel and the second upper panel are locked in position.

7. The mobile stage system as recited in claim 1, wherein the stage frame is fixedly connected to the support structure and extends substantially vertically.

8. The mobile stage system of claim 1, wherein the bell-crank linkage is comprised of multiple members fixed relative to the outer deck panel.

9. The mobile stage system of claim 8, wherein the bell-crank linkage comprises: a bell-crank superstructure with one or more of the multiple members positioned above the outer deck panel; and a bell-crank substructure with one or more of the multiple members positioned below the outer deck panel.

10. A mobile stage system for transitioning between a transport position and a deployed position, comprising:
a support structure mounted on wheels;
a stage frame extending upward from the support structure, wherein the stage frame includes a first corner column fixedly connected at a first edge of the support structure adjacent to a first end of the support structure, and a second corner column fixedly connected at a second edge of the support structure adjacent to a second end of the support structure opposite the first end of the support structure;
an outer deck panel pivotally connected to the support structure opposite from the stage frame;
a first upper panel pivotally connected to the stage frame, wherein the first upper panel is pivotally connected to upper ends of the first corner column and the second corner column;
one or more linkage members operably connecting the outer deck panel to the first upper panel; and
one or more actuators operably connected to the outer deck panel, such that, through activation of the one or more actuators, the outer deck panel rotates and transitions between the transport position and the deployed position, and, as a result of the rotation of the outer deck panel from the transport position to the deployed position, the one or more linkage members cause the first upper panel to rotate upward relative to the stage frame.

11. The mobile stage system as recited in claim 10, and further comprising a sidewall panel extending between the first corner column and the second corner column.

12. A mobile stage system for transitioning between a transport position and a deployed position, comprising:
a support structure mounted on wheels;
a stage frame extending upward from the support structure;
an outer deck panel pivotally connected to the support structure opposite from the stage frame;
a first upper panel pivotally connected to the stage frame;
one or more linkage members operably connecting the outer deck panel to the first upper panel; and
one or more actuators operably connected to the outer deck panel, such that, through activation of the one or more actuators, the outer deck panel rotates and transitions between the transport position and the deployed position, and, as a result of the rotation of the outer deck panel from the transport position to the deployed position, the one or more linkage members cause the first upper panel to rotate upward relative to the stage frame; and
a hitch assembly secured to the support structure and configured to transition from a first position to a second position via rotation about a vertical axis, such that, in the second position, the hitch assembly engages an underlying surface and supports the mobile stage system while the mobile stage system transitions between the transport position and the deployed position.

13. The mobile stage system as recited in claim 12, wherein the hitch assembly includes a first member and a second member, with each of the first member and the second member being pivotally connected to the support structure, and with respective distal ends of the first member and the second member being removably connected to one another, such that the first member and the second member can be disconnected and then rotated independently from the first position to the second position.

14. The mobile stage system as recited in claim 13, wherein the hitch assembly includes a leg extending from the second member, which, when the hitch assembly is in the second position, engages the underlying surface and supports the mobile stage system while the mobile stage system transitions between the transport position and the deployed position.

15. A mobile stage system for transitioning between a transport position and a deployed position, comprising:
a support structure mounted on wheels;
a stage frame extending upward from the support structure;
an outer deck panel pivotally connected to the support structure opposite from the stage frame;
a first upper panel pivotally connected to the stage frame;
a bell-crank linkage pivotally connected to the support structure and fixedly connected to the outer deck panel;
a first strut extending between the bell-crank linkage and the first upper panel, the first strut pivotally connected to the bell-crank linkage and to the first upper panel; and
one or more actuators operably connected to the bell-crank linkage, such that, as the one or more actuators are retracted, the outer deck panel rotates about a pivot axis relative to the support structure in a first direction from the transport position to the deployed position, while, as a result of an upward movement of the first strut caused by the rotating bell-crank linkage, the first upper panel rotates about a pivot axis relative to the stage frame in a second direction opposite the first direction.

16. The mobile stage system as recited in claim 15, and further comprising:
a second upper panel pivotally connected to a forward edge of the first upper panel opposite the stage frame; and
a second strut extending between the bell-crank linkage and the second upper panel, the second strut pivotally connected to the bell-crank linkage and to the second upper panel, such that, as the one or more actuators are retracted, as a result of an upward movement of the second strut caused by the rotating bell-crank linkage, the second upper panel rotates about a pivot axis relative to the first upper panel in the second direction.

17. The mobile stage system as recited in claim 16, and further comprising:
a main deck panel mounted to the support structure;
wherein, when the mobile stage system is in the deployed position, the outer deck panel is in a substantially horizontal orientation and cooperates with the main deck panel to form a stage deck, with the first upper panel and the second upper panel extending over the stage deck.

18. The mobile stage system as recited in claim 16, wherein, when the mobile stage system is in the deployed position, the first strut extends beyond a pivot axis between the outer deck panel and the support structure, and the second strut extends beyond the pivot axis between the outer deck panel and the support structure, such that the first upper panel and the second upper panel are locked in position.

19. The mobile stage system of claim 15, wherein the bell-crank linkage is comprised of multiple members fixed relative to the outer deck panel.

20. The mobile stage system of claim 19, wherein the bell-crank linkage comprises: a bell-crank superstructure with one or more of the multiple members positioned above the outer deck panel; and a bell-crank substructure with one or more of the multiple members positioned below the outer deck panel.

21. A mobile stage system for transitioning between a transport position and a deployed position, comprising:
a support structure mounted on wheels;
a stage frame extending upward from the support structure;
an outer deck panel pivotally connected to the support structure opposite from the stage frame;
a first upper panel pivotally connected to the stage frame;
a second upper panel pivotally connected to a forward edge of the first upper panel opposite the stage frame;
a bell-crank linkage fixedly connected to the outer deck panel;
a first strut extending between the bell-crank linkage and the first upper panel, the first strut pivotally connected to the bell-crank linkage and the first upper panel;
a second strut extending between the bell-crank linkage and the second upper panel, the second strut pivotally connected to the bell-crank linkage and the second upper panel; and
an actuator operably connected to the bell-crank linkage, such that, when the actuator is retracted, the bell-crank linkage and outer deck panel rotate downward, and, as such, the first strut is forced upward by the rotating bell-crank linkage, thus pushing and rotating the first upper panel upward, and the second strut is forced upward by the rotating bell-crank linkage, thus pushing and rotating the second upper panel upward.

22. The mobile stage system as recited in claim 21, wherein, when the mobile stage system is in the deployed position, the first strut extends beyond a pivot axis between the outer deck panel and the support structure, and the second strut extends beyond the pivot axis between the outer deck panel and the support structure, such that the first upper panel and the second upper panel are locked in position.

* * * * *